T. W. C. HARTMANN.
SPRING.
APPLICATION FILED APR. 27, 1918.
1,274,542.
Patented Aug. 6, 1918.
2 SHEETS—SHEET 1.
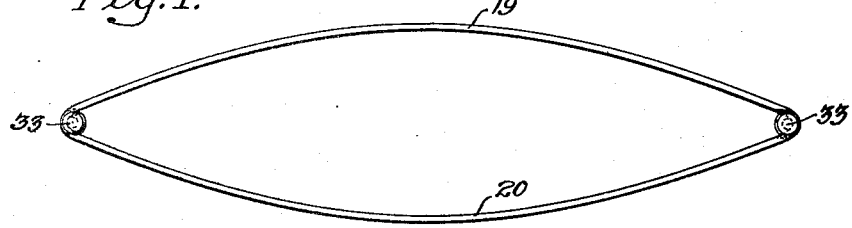
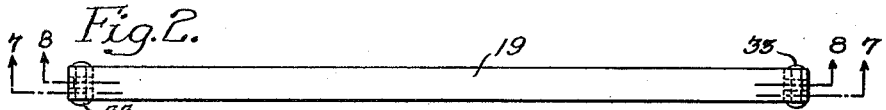
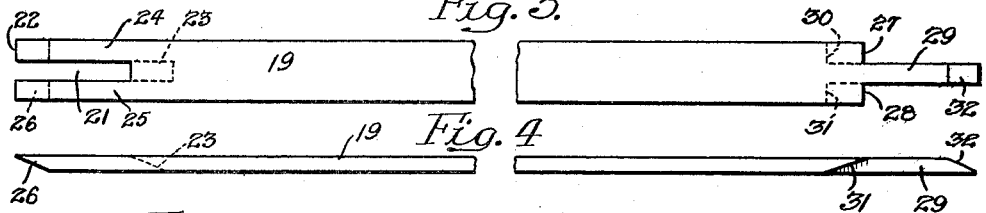
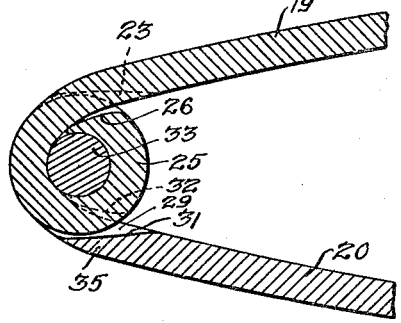
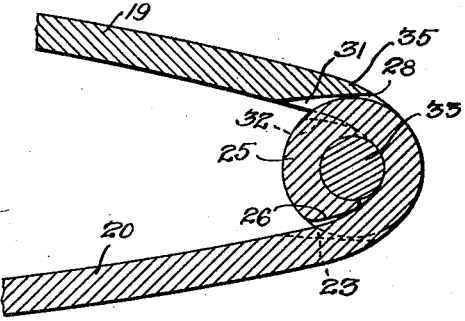
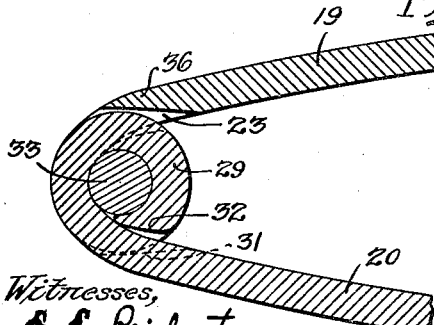
Witnesses,
S. E. Reichart
Augustus B. Coppes
Inventor
Thomas W. C. Hartmann
By Joshua R. H. Potts
his Attorney T. W. C. HARTMANN.
SPRING.
APPLICATION FILED APR. 27, 1918.
1,274,542.
Patented Aug. 6, 1918.
2 SHEETS—SHEET 2.
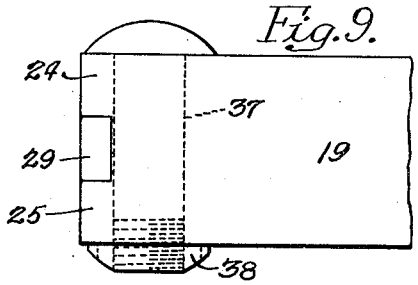
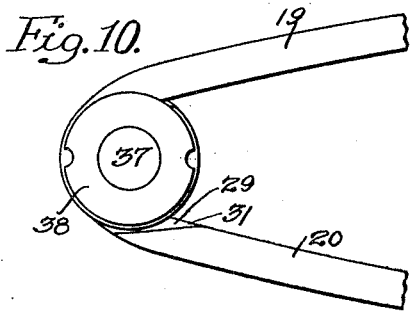
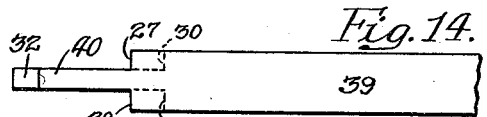
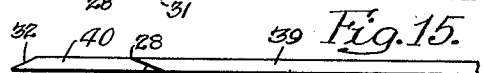
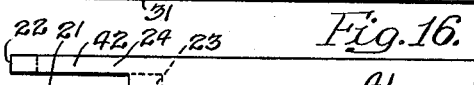
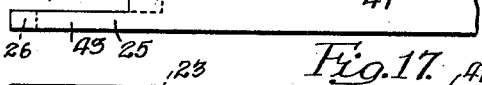
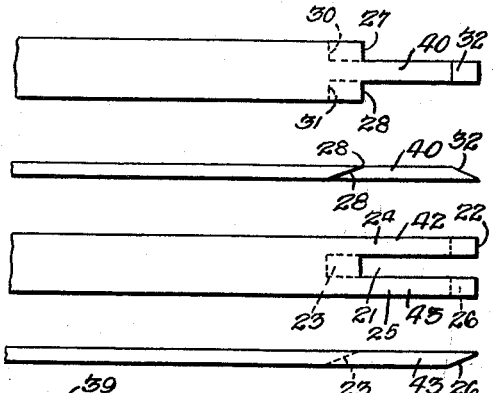
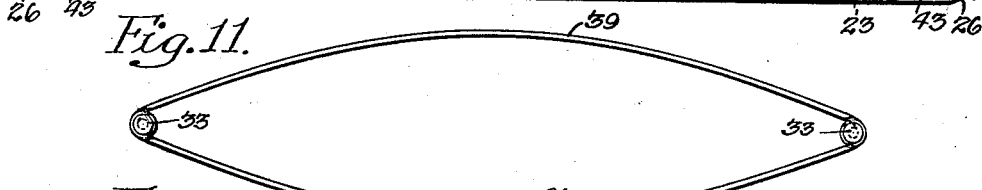
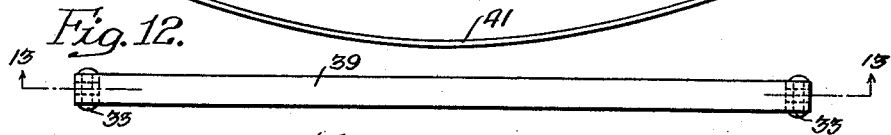
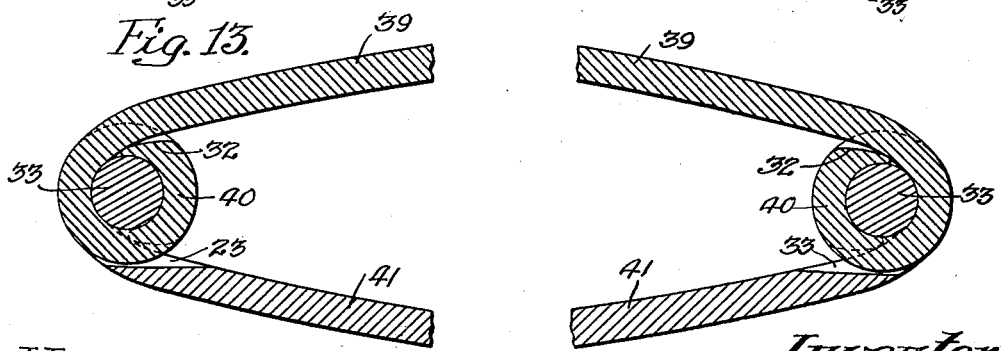
Witnesses,
E. E. Reichart
Augustus R. Copples
Inventor,
Thomas W. C. Hartmann
By Joshua R. H. Toth
his Attorney

UNITED STATES PATENT OFFICE.

THOMAS W. C. HARTMANN, OF PHILADELPHIA, PENNSYLVANIA.

SPRING.

1,274,542.  Specification of Letters Patent.  Patented Aug. 6, 1918.

Application filed April 27, 1918. Serial No. 231,096.

*To all whom it may concern:*

Be it known that I, THOMAS W. C. HARTMANN, a citizen of the United States, residing at Philadelphia, in the county of Philadelphia and State of Pennsylvania, have invented certain new and useful Improvements in Springs, of which the following is a specification.

One object of my invention is to provide an elliptic spring, the parts of which can be made and assembled quickly and accurately.

Another object is to so construct my improved spring that it will be extremely strong and durable and will be practically noiseless in operation.

These objects, and other advantageous ends which will be described hereinafter, I attain in the following manner, reference being had to the accompanying drawings in which—

Figure 1 is a front elevation of my improved spring,

Fig. 2 is a top plan view of Fig. 1,

Fig. 3 is a top plan view of one of the leaves of the spring before the same is bent into shape, Fig. 4 is a side elevation of Fig. 3, Fig. 5 is a view of the left end of the leaf shown in Figs. 3 and 4, Fig. 6 is a view of the right end of said leaf, Fig. 7 is an enlarged section taken on the line 7—7 of Fig. 2, the central portion of the spring being broken away.

Fig. 8 is an enlarged section taken on the line 8—8 of Fig. 2, the central portion of the spring being broken away, Fig. 9 is a fragmentary top plan view of one end of my improved spring, showing the same assembled by a bolt and nut, Fig. 10 is a front elevation of Fig. 9, Fig. 11 is a front elevation of a modified form of my improved spring, Fig. 12 is a top plan view of the spring shown in Fig. 11, Fig. 13 is an enlarged section taken on the line 13—13 of Fig. 12 in which the central portion of the spring is broken away, Fig. 14 is a top plan view of the upper leaf of the spring shown in Figs. 11 to 13, inclusive, Fig. 15 is a side elevation of Fig. 14, Fig. 16 is a top plan view of the lower leaf of said latter mentioned spring, and Fig. 17 is a side elevation of the leaf shown in Fig. 16.

Referring to Figs. 1 to 8, inclusive, of the drawings, the spring includes two leaves 19 and 20. Each of these leaves is similarly constructed and is preferably made of strap steel and is cut at its opposite ends as clearly shown in Figs. 3 to 6, inclusive. This cutting forms an important part of my invention since it provides integral securing portions for the leaves by which they can be pivotally connected to form the shape spring as clearly shown in Figs. 1, 7, and 8.

One end portion has a central notch 21 extending inwardly from its extreme end 22 and longitudinally of the leaf, as clearly shown in Fig. 3. This notch, for the greater portion of its length, is cut entirely through the leaf and is then continued at a slant or incline to form an undercut recess 23. The notch 21 divides this end portion of the leaf, producing two integral tongues 24 and 25 which are positioned laterally or at either side of a center line dividing the width of the leaf. The tongues 24 and 25 are beveled as shown at 26, said beveling forming an undercutting or scarfing which extends substantially parallel to the undercut recess 23 as shown in Figs. 4 and 5.

The opposite end portion of each of the leaves 19 and 20 is notched at 27 and 28 to provide a central integral tongue 29, said notches being extended to provide undercut recesses 30 and 31, the inner walls of said undercut recesses being formed by the continuation of the sides of the central tongue 29. The tongue 29 is scarfed or beveled at its outer end as shown at 32 and this scarfed end is for a purpose hereinafter described.

The opposite end portions of each of the leaves 19 are bent to provide eyelets as clearly shown in Figs. 7 and 8, the bending at one end of each of the leaves including the lateral tongues 24 and 25 and a part of the undercut recessed portion 23. The bending of the opposite end portions of the leaves includes the central tongues 29 and a portion of the leaves including a part of the undercut recesses 30 and 31. It will of course be understood that the leaves 19 and 20 are bowed so that when they are assembled they will produce an elliptic spring and in assembling the leaves the eyelets formed by the central tongues 29 of each leaf are inserted between the eyelets formed by the lateral tongues 24 and 25.

When in this position pivot pins or bolts 33 are inserted through the assembled eyelets at each end and riveted. The bending of the eyelets is such that portions of the tongues 24 and 25 fit within the undercut recesses 30 and 31 as clearly shown at the left-hand end of Fig. 7. Thus a portion 35 of the leaf adjacent the recesses 30 and 31 overlaps the tongues 24 and 25, as shown in Fig. 7.

The scarfed ends 32 of the central tongues 29 enable said tongues 29 to substantially surround the entire circumference of the pivot pins 33 as shown in Fig. 8. In similar manner the scarfed portions 26 of the tongues 24 and 25 permit these latter tongues to substantially surround the entire circumference of the pivot pins 33. A portion of the eyelets produced by the central tongues 29 extends within the undercut recesses 23 and the overhanging portions 36 serve as a covering for said latter mentioned portions of the central tongues 29. Thus a spring is produced in which the inner ends of all parts of the eyelets are under the cover of the main portions of the leaves, and when weight is applied to the spring, the eyelets will freely pivot but there is no chance of them opening up since they are located within the confines of the overhanging portions produced by the undercut recesses. This is an important and valuable feature of my invention and springs made in accordance therewith will support great weight without breaking or becoming loose and at the same time a free and substantially noiseless pivotal movement between the parts is attained.

In the form of my invention shown in Figs. 9 and 10 instead of riveting the pivot pins I have illustrated bolts 37 provided with nuts 38 so that the parts can be separated by removing the nuts 38. In all other respects the construction is similar to that described in Figs. 1 to 8, inclusive, and I have, therefore, given similar parts corresponding reference numerals.

In the form of my invention shown in Figs. 11 to 17, inclusive, I employ the same principle of construction with the exception that instead of having both of the leaves similarly constructed, each having a single tongue on one end and double or lateral tongues on the opposite end, I provide a construction in which one leaf 39 has central tongues 40 at both ends while the other leaf 41 has each of its opposite ends cut to provide lateral or double tongues 42 and 43. In all other respects the construction is similar to that described in connection with Figs. 1 to 8, inclusive, and I have given the undercut and scarfed portions similar reference numerals in both the constructions.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A spring of the character described including two leaves, one leaf having integral tongues spaced apart and bent to form an eyelet, the other leaf having a central integral tongue bent to form an eyelet and fitting between the bent tongues of said first leaf; and a pivot member extending through the eyelets thus joined, substantially as described.

2. A spring of the character described including two leaves, one leaf having integral tongues spaced apart and bent to form an eyelet, the other leaf having a central integral tongue bent to form an eyelet and fitting between the bent tongues of said first leaf; and a pivot member extending through the eyelets thus joined, said first leaf having an undercut recess in alinement with the space between its tongues whereby an overlapping portion is provided for a portion of the tongue of said second leaf, substantially as described.

3. A spring of the character described including two leaves, one leaf having integral tongues spaced apart and bent to form an eyelet, the other leaf having a central integral tongue bent to form an eyelet and fitting between the bent tongues of said first leaf; and a pivot member extending through the eyelets thus joined, said first leaf having an undercut recess in alinement with the space between its tongues whereby an overlapping portion is provided for a portion of the tongue of said second leaf, said second mentioned leaf having undercut recesses at either side of its tongue to provide overlapping portions for the bent tongues of said first mentioned leaf, substantially as described.

4. A spring of the character described including two leaves, one leaf having integral tongues spaced apart and bent to form an eyelet, the other leaf having a central integral tongue bent to form an eyelet and fitting between the bent tongues of said first leaf; and a pivot member extending through the eyelets thus joined, said tongues of each leaf having scarfed ends to permit them to surround substantially the entire circumference of said pivot members, substantially as described.

In testimony whereof I have signed my name to this specification in the presence of two subscribing witnesses.

THOMAS W. C. HARTMANN.

Witnesses:
ROGER WILLIAMS,
AUGUSTUS B. COPPES.

Copies of this patent may be obtained for five cents each, by addressing the "Commissioner of Patents, Washington, D. C."